United States Patent
Konisho et al.

(10) Patent No.: US 11,934,936 B2
(45) Date of Patent: Mar. 19, 2024

(54) OPTICAL COMPUTING ELEMENT AND MULTI-NEURAL NETWORK

(71) Applicant: Nippon Telegraph and Telephone Corporation, Tokyo (JP)

(72) Inventors: Shiori Konisho, Musashino (JP); Takuya Otsuka, Musashino (JP); Soichi Oka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 854 days.

(21) Appl. No.: 16/982,009

(22) PCT Filed: Apr. 11, 2019

(86) PCT No.: PCT/JP2019/015744
§ 371 (c)(1),
(2) Date: Sep. 17, 2020

(87) PCT Pub. No.: WO2019/198783
PCT Pub. Date: Oct. 17, 2019

(65) Prior Publication Data
US 2021/0019595 A1    Jan. 21, 2021

(30) Foreign Application Priority Data

Apr. 13, 2018  (JP) ................................ 2018-077283

(51) Int. Cl.
| | |
|---|---|
| *G06N 3/04* | (2023.01) |
| *G02F 1/01* | (2006.01) |
| *G02F 3/00* | (2006.01) |

(52) U.S. Cl.
CPC ............. *G06N 3/04* (2013.01); *G02F 1/0147* (2013.01); *G02F 3/00* (2013.01)

(58) Field of Classification Search
CPC ............. G06N 3/04; G02F 1/0147; G02F 3/00
(Continued)

(56) References Cited

U.S. PATENT DOCUMENTS

| | | | |
|---|---|---|---|
| 6,876,788 B2 * | 4/2005 | Schroeder | ............ G02B 6/3538 385/17 |
| 7,469,084 B2 * | 12/2008 | Aalto | ..................... G02B 6/125 385/28 |

(Continued)

OTHER PUBLICATIONS

International Search Report and Written Opinion dated May 28, 2019, issued in PCT Application No. PCT/JP2019/015744, filed Apr. 11, 2019.

(Continued)

*Primary Examiner* — William R Alexander
*Assistant Examiner* — Sharrief I Broome
(74) *Attorney, Agent, or Firm* — Workman Nydegger

(57) ABSTRACT

An optical operational element which enables a multilayered optical neural network to be constructed without using an optical amplifier is provided. The optical operational element includes: a photothermal conversion unit 30 which converts light energy of input light A into thermal energy; a light intensity variation unit 20 which is in contact with the photothermal conversion unit 30 and which varies, in accordance with a temperature variation accompanying heat generation or heat absorption by the photothermal conversion unit 30, intensity of external light B that is introduced from the outside; and a housing unit 10 which houses the light intensity variation unit 20 and which introduces the external light B from one side and outputs output light C obtained by attenuating intensity of the external light B to the outside on an opposite side to the one side.

6 Claims, 9 Drawing Sheets

(58) Field of Classification Search
USPC .......................................................... 359/288
See application file for complete search history.

(56) References Cited

U.S. PATENT DOCUMENTS

| | | | | |
|---|---|---|---|---|
| 2004/0047545 | A1* | 3/2004 | Schroeder | G02B 6/3538 |
| | | | | 385/17 |
| 2007/0286552 | A1* | 12/2007 | Aalto | G02B 6/125 |
| | | | | 385/50 |
| 2008/0037936 | A1* | 2/2008 | Lee | G02B 6/12028 |
| | | | | 385/37 |
| 2010/0226608 | A1* | 9/2010 | Chen | G02B 6/1225 |
| | | | | 264/1.25 |
| 2016/0162798 | A1* | 6/2016 | Marandi | G02F 3/00 |
| | | | | 708/191 |
| 2017/0351293 | A1* | 12/2017 | Carolan | G02F 3/024 |

OTHER PUBLICATIONS

Yichen Shen et al. *Deep Learning with Coherent Nanophotonic Circuits*, Nature Photonics, vol. 11. Jul. 2017, pp. 441-446.

* cited by examiner

OPTICAL COMPUTING ELEMENT AND MULTI-NEURAL NETWORK

TECHNICAL FIELD

The present invention relates to an optical operational element that constitutes an optical neural network and to a multilayer neural network.

BACKGROUND ART

An optical neural network models a nerve cell network in the human brain using units made up of two type of neurons, namely, an input layer neuron and an output layer neuron, and a synapse that couples the neurons with each other and realizes a network using optical signals.

An optical neural network is generally configured by multiple layers of coupled neuron elements that execute product-sum operations and non-linear operations. A conventional optical neural network must perform photoelectric conversion for the purpose of amplifying optical signals that attenuate due to multi-layering (for example, refer to NPL 1).

CITATION LIST

Non Patent Literature

[NPL 1] Yichen Shen, et al. "Deep learning with coherent nanophotonic circuits." Nature Photonics, 11, 441-446, 2017.

SUMMARY OF THE INVENTION

Technical Problem

Conventional optical neural networks have a problem in that, since operations using optical signals and electric signals are alternately performed, there is significant speed loss and power loss that accompany photoelectric conversion.

The present invention has been made in consideration of the problem described above and an object thereof is to provide an optical operational element which enables a multilayered optical neural network to be constructed and a multilayer neural network.

Means for Solving the Problem

An optical operational element according to an aspect of the present embodiment includes: a photothermal conversion unit which converts light energy of input light into thermal energy; a light intensity variation unit which is in contact with the photothermal conversion unit and which varies, in accordance with a temperature variation accompanying heat generation or heat absorption by the photothermal conversion unit, intensity of external light that is introduced from the outside; and a housing unit which houses the light intensity variation unit and which introduces the external light from one side and outputs output light obtained by attenuating intensity of the external light to the outside on an opposite side to the one side.

In addition, a multilayer neural network according to an aspect of the present embodiment is a multilayer neural network in which N (N≥2)-number of the optical operational elements described above are cascade-connected, wherein the input light of an optical operational element of an n (n=2, 3, . . . , N)-th layer includes output light of an optical operational element of an n−1-th layer.

Effects of the Invention

According to the present invention, an optical operational element which enables a multilayered optical neural network to be constructed without performing photoelectric conversion and a multilayer neural network can be provided.

DESCRIPTION OF EMBODIMENTS

Hereinafter, embodiments of the present invention will be described with reference to the drawings. Same elements in a plurality of drawings will be denoted by same reference signs and descriptions will not be repeated.

First Embodiment

Figure 1:
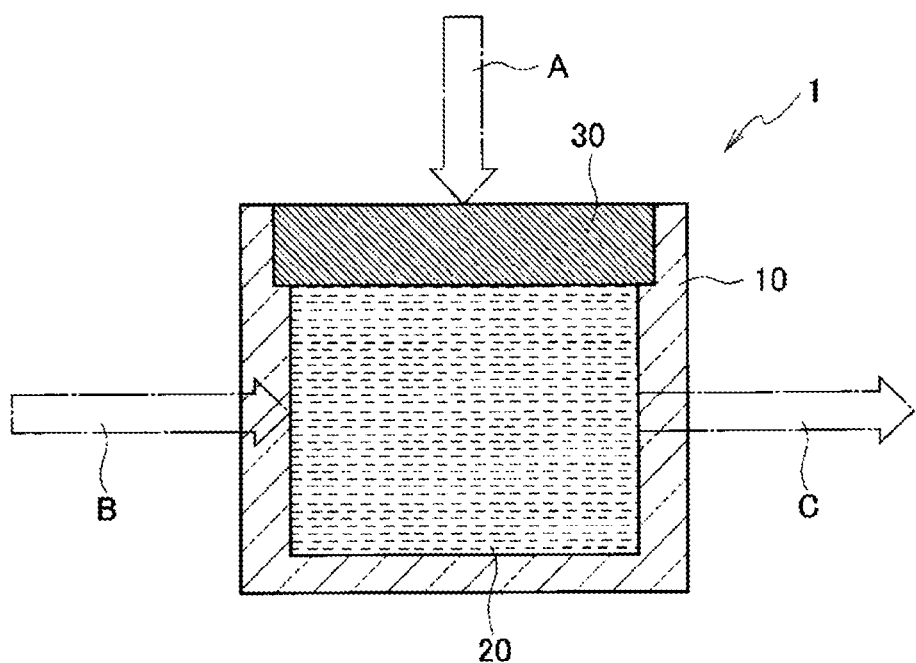
FIG. 1 is a diagram schematically showing a configuration example of an optical operational element according to a first embodiment of the present invention.

FIG. 1 is a diagram schematically showing a configuration example of an optical operational element according to a first embodiment of the present invention. An optical operational element 1 shown in FIG. 1 receives input of input light A and external light B, and converts (output light C) the external light B in accordance with intensity of the input light A. The input light A is, for example, an optical signal subjected to a product-sum operation. The optical operational element 1 is an optical operational element capable of constructing an optical neural network without using photoelectric conversion.

External light is, literally, light introduced from the outside. The outside is, for example, outdoors and refers to outside of an environment in which the optical operational element 1 is placed. In the present embodiment, the external light B is defined as light with certain intensity which is let in from outside (outdoors) of the optical operational element 1. The intensity of the external light B may fluctuate to a certain degree.

The optical operational element 1 includes a housing unit 10, a light intensity variation unit 20, and a photothermal conversion unit 30. In FIG. 1, each of the input light A, the external light B, and the output light C is depicted by a bold arrow (a dashed-dotted line) and depiction of a transmission path that transmits each type of light is omitted. Hereinafter, a direction of external light B→output light C will be referred to as a propagation direction of the external light B.

The housing unit 10 is made of, for example, quartz or an organic molecular polymer and is shaped like a tub so as to have an opening and include an inside space (a depressed portion). The light intensity variation unit 20 is housed in the space. A transmission path (not illustrated) which guides the input light A, the external light B, and the output light C is constituted by a material with a higher refractive index than other portions of the housing unit 10. Portions of the transmission path of the housing unit 10 are portions depicted by bold arrows of walls on one side and another side of the housing unit 10. The housing unit 10 is formed by processing, for example, cubic quartz using a known semiconductor process and a known micromachining technique.

The light intensity variation unit 20 which varies transmittance of light in accordance with a temperature variation is housed inside the tub-shaped housing unit 10. The light intensity variation unit 20 is constituted by, for example, an aqueous PNIPA solution obtained by dissolving N-isopropylacrylamide (PNIPA) which is a thermal phase transition material in water.

An aqueous PNIPA solution exhibits LCST (Lower Critical Solution Temperature) behavior in which dispersed polymers become soluble and transmit light when cooled and agglomerated polymers become insoluble and scatter light when heated. PNIPA stands for poly (N-isopropylacrylamide). Since PNIPA is present in powder form, PNIPA is dissolved in water and used as an aqueous solution or in a gel form.

The photothermal conversion unit 30 converts light energy of the input light A into thermal energy. The photothermal conversion unit 30 is constituted by, for example, titanium nitride (TiN) or carbon (C). Titanium nitride absorbs a spectrum of sunlight with high light absorptivity and efficiently converts light energy into thermal energy.

The photothermal conversion unit 30 may be constituted by a solid such as titanium nitride or may be configured by coating a surface of a solid with high thermal conductivity such as gold (Au) or silver (Ag) with a thin film of titanium nitride or the like.

As shown in FIG. 1, a cross section of the photothermal conversion unit 30 in a propagation direction of the external light B is, for example, a rectangle. In addition, the photothermal conversion unit 30 is fitted so as to come into contact with the light intensity variation unit 20 that is housed inside the housing unit 10 (in the depressed portion) and to act as a lid of the depressed portion of the housing unit 10.

The input light A is input via a transmission path (not shown) to a surface of the photothermal conversion unit 30 on an opposite side to the light intensity variation unit 20 in a direction that is perpendicular to the propagation direction of the external light B. The photothermal conversion unit 30 generates thermal energy in accordance with the intensity of the input light A, applies heat to or absorbs heat from the light intensity variation unit 20, and varies temperature of the light intensity variation unit 20. The light intensity variation unit 20 of which the temperature varies outputs, in the propagation direction of the external light B, the output light B obtained by attenuating the intensity of the external light B in accordance with the intensity of the input light A.

As described above, the optical operational element 1 according to the present embodiment includes: the photothermal conversion unit 30 which converts light energy of input light A into thermal energy; the light intensity variation unit 20 which is in contact with the photothermal conversion unit 30 and which varies, in accordance with a temperature variation accompanying heat generation or heat absorption by the photothermal conversion unit 30, intensity of external light B introduced from the outside; and a housing unit 10 which houses the light intensity variation unit 20 and which introduces the external light B from one side and outputs output light C obtained by attenuating intensity of the external light B to the outside on an opposite side to the one side.

Accordingly, the output light C representing a variation of the intensity of the external light B let in from outside in accordance with the intensity of the input light A can be generated. In other words, even when a large number of the optical operational elements 1 are connected in a cascade, by fixing the external light B at a prescribed constant intensity, the intensity of the output light C of each optical operational element 1 is to be solely determined by the intensity of the input light A which is input from a previous layer (a previous stage).

Therefore, the optical operational element 1 according to the present embodiment is capable of constructing a multilayered optical neural network without performing photoelectric conversion. It should be noted that the optical operational element 1 shown in FIG. 1 may be arranged upside down. In this case, the input light A is to be input to a bottom surface of the optical operational element 1.

In addition, for example, the optical operational element 1 shown in FIG. 1 may be rotated clockwise by 90 degrees. In this case, the propagation direction of the external light B is a vertical direction and the input light A is to be input to a right side surface. Alternatively, the optical operational element 1 may be rotated counterclockwise by 90 degrees.

Next, the present embodiment will be described in greater detail by presenting specific examples of the photothermal conversion unit 30 and the light intensity variation unit 20 of the optical operational element 1.

Photothermal Conversion Unit

Figure 2:
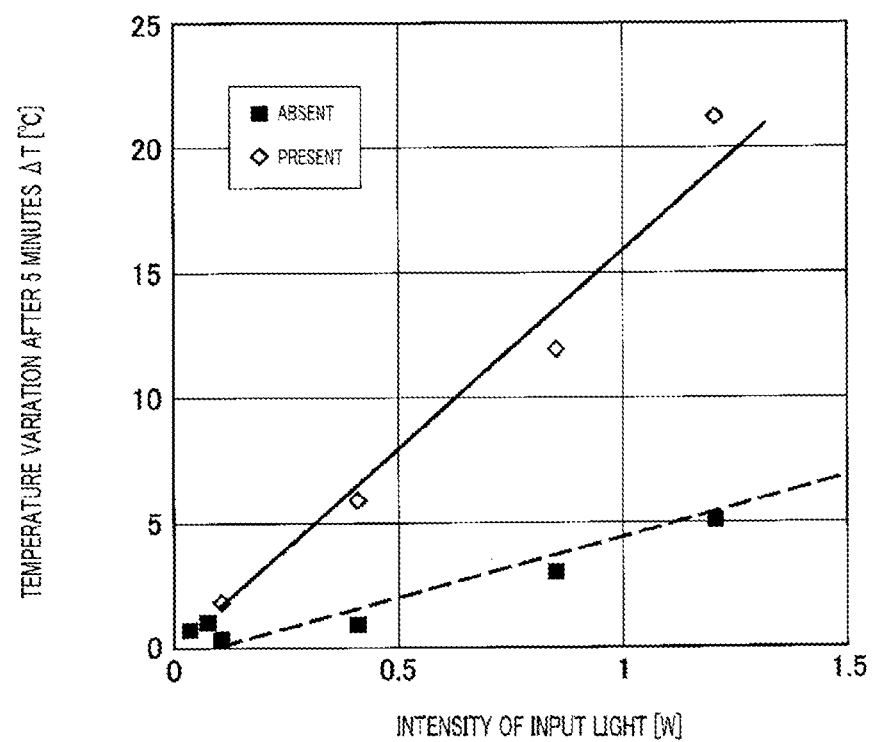
FIG. 2 is a graph showing an example of a temperature variation of a light intensity variation unit when input light is input to a photothermal conversion unit shown in FIG. 1.

FIG. 2 is a graph showing examples of the temperature variation of the light intensity variation unit 20 due to the presence or absence of the photothermal conversion unit 30. An abscissa represents intensity [W] of the input light A and an ordinate represents a temperature variation $\Delta T$ [° C.] of the light intensity variation unit 20 at 5 minutes after start of input of the input light A. A plot ■ indicates data when the photothermal conversion unit 30 is absent and a plot ◇ indicates data when the photothermal conversion unit 30 is present. With respect to the data shown in FIG. 2, the housing unit 10 was made of quartz glass and the light intensity variation unit 20 was made of water, and the temperature of water after being irradiated with light for 5 minutes was measured using an infrared thermometer. It should be noted that the photothermal conversion unit 30 was made of carbon.

As shown in FIG. 2, the intensity (power) of the input light A necessary to vary the temperature of the light intensity variation unit 20 by 5° C. is approximately 0.3 W when the photothermal conversion unit 30 is present (◇) and approximately 1.1 W when the photothermal conversion unit 30 is absent (■). This reveals that the temperature of the light intensity variation unit 20 can be varied more efficiently when the photothermal conversion unit 30 is provided.

While the ordinate in FIG. 2 represents a temperature variation at 5 minutes after the start of input of the input light A, by downsizing the photothermal conversion unit 30 and the light intensity variation unit 20, the time required by the temperature variation can be shortened. In other words, reaction time can be reduced by shortening a distance between the photothermal conversion unit 30 and the light intensity variation unit 20 through which the external light B passes or by reducing masses and capacities of the photothermal conversion unit 30 and the light intensity variation unit 20

Light Intensity Variation Unit

Figure 3:
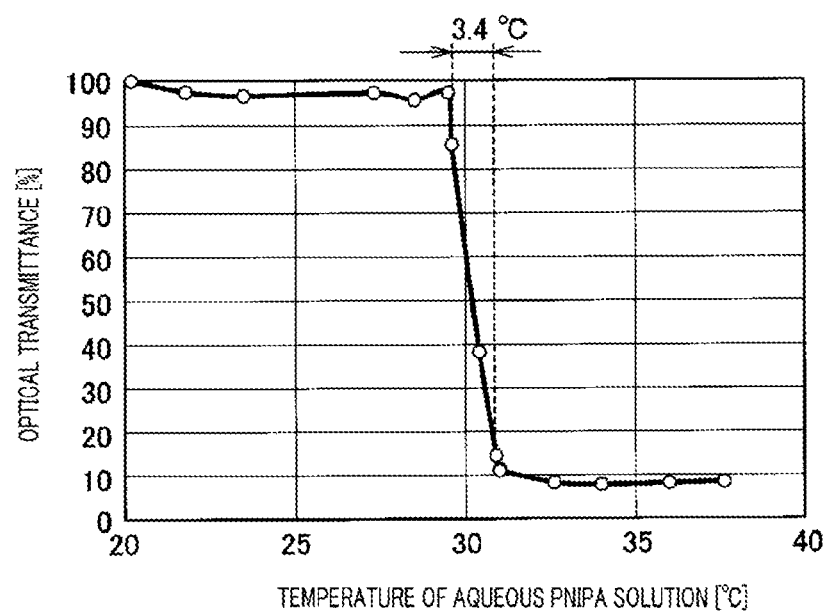
FIG. 3 is a graph showing an example of a relationship between temperature of an aqueous PNIPA solution and optical transmittance.

FIG. 3 is a graph showing an example of a variation in optical transmittance when temperature of an aqueous PNIPA solution that constitutes the light intensity variation unit 20 is varied. An abscissa represents a temperature [° C.] of the aqueous PNIPA solution and an ordinate represents optical transmittance [%].

The temperature variation shown in FIG. 3 was caused by placing the optical operational element 1 on a temperature controller. In addition, transmittance was measured using a red light source as a light source equivalent to the external light B and by receiving light transmitted through the optical operational element 1 with an optical receiver.

As shown in FIG. 3, transmittance changes from approximately 98% at approximately 29.5° C. to approximately 10% at approximately 31° C. A temperature at which the optical transmittance abruptly varies in this manner is referred to as a cloud point. In this experiment example, a switching characteristic that turns on and off during a temperature variation of approximately 3.4° C. can be confirmed.

The relationship between temperature and transmittance shown in FIG. 3 can be varied according to the shape of the photothermal conversion unit 30. In addition, a logic of the optical operational element which is a direction of a variation of the output light C relative to the input light A can be inverted. Logic inversion will be described later.

Next, an embodiment which represents a change in the relationship (FIG. 3) between temperature and transmittance will be described.

Second Embodiment

Figure 4:
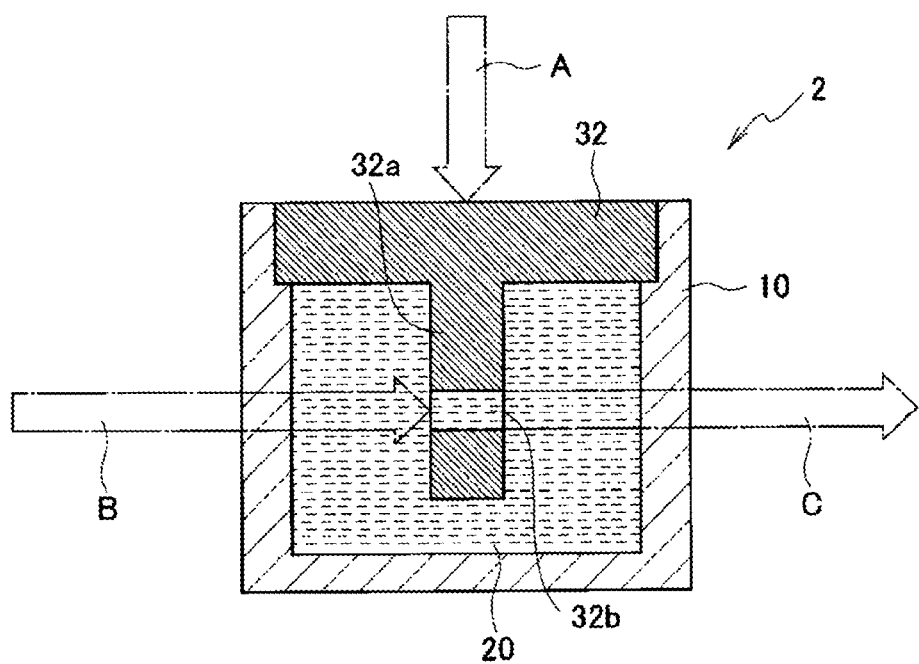
FIG. 4 is a diagram schematically showing a configuration example of an optical operational element according to a second embodiment of the present invention.

FIG. 4 is a diagram schematically showing a configuration example of an optical operational element according to a second embodiment of the present invention. In an optical operational element 2 shown in FIG. 4, a shape of a photothermal conversion unit 32 differs from that of the photothermal conversion unit 30 of the optical operational element 1 (FIG. 1).

As shown in FIG. 4, a cross section of the photothermal conversion unit 32 in a propagation direction of the external light B is, for example, a T-shape. The photothermal conversion unit 32 differs from the photothermal conversion unit 30 in that the photothermal conversion unit 32 is provided with a protruding portion 32a which protrudes toward a side of the light intensity variation unit 20 from a center portion of a lid portion that closes the depressed portion of the housing unit 10.

The protruding portion 32a is extended until the protruding portion 32a almost abuts against a bottom of the housing unit 10 and includes an opening 32b through which the external light B passes. The relationship (FIG. 3) between temperature and transmittance can be varied by a size and a position of the opening 32b in the protruding portion 32a.

A temperature variation (rise) caused by heat generation (input of the input light A) of the photothermal conversion unit 32 is transmitted from the lid portion that covers the depressed portion of the housing unit 10 toward a tip portion of the protruding portion 32a. In other words, heat generated by inputting the input light A to the photothermal conversion unit 32 is transmitted from a root portion toward a tip of the protruding portion 32a and causes the temperature of the light intensity variation unit 20 to vary.

Conversely, a temperature variation caused by heat absorption involves the heat of the light intensity variation unit 20 being transmitted from the protruding portion 32a to the lid portion that covers the depressed portion of the housing unit 10 and being released from the lid portion. As described above, transmission directions of temperature are opposite between heat generation and heat absorption. However, cases where the temperature of the light intensity variation unit 20 varies share a common trait of having a temperature gradient in an extension direction of the protruding portion 32a.

In consideration thereof, the opening 32b which transmits the external light B is provided within a range having a temperature gradient of the photothermal conversion unit 32. The relationship between temperature and transmittance shown in FIG. 3 can be varied according to the shape of the opening 32b.

Figure 5:
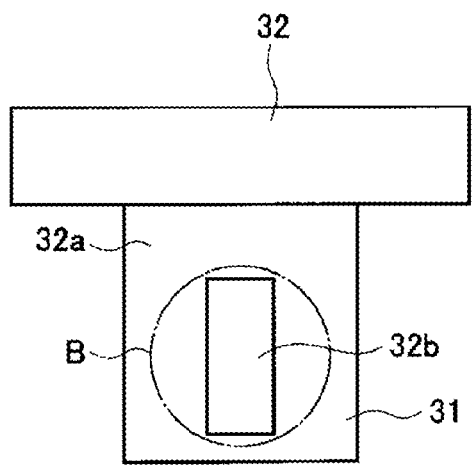
FIG. 5 is a diagram schematically showing a shape of an example of a photothermal conversion unit shown in FIG. 4 when viewed from front.

FIG. 5 is a diagram which schematically shows the photothermal conversion unit 32 provided with a long slit in the transmission direction of temperature of the protruding portion 32a and which is a front view of the photothermal conversion unit 32 as viewed in a propagation direction of the external light B. A dashed-dotted line circle shown in FIG. 5 denotes a beam of the external light B.

Figure 6:
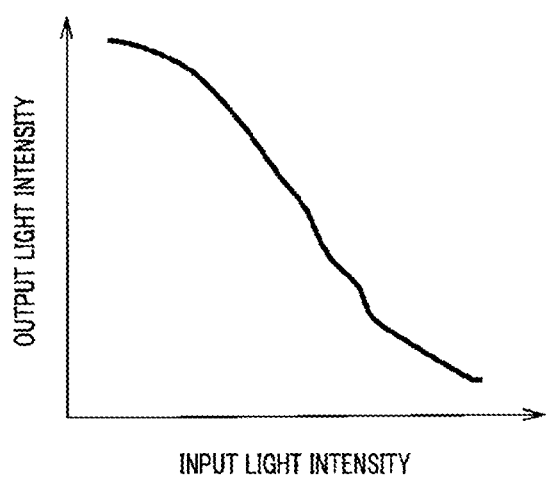
FIG. 6 is a diagram schematically showing a relationship between input light intensity and output light intensity of an optical operational element including the photothermal conversion unit shown in FIG. 5.

FIG. 6 is a graph schematically showing a relationship between a temperature and transmittance of the optical operational element 2 provided with the photothermal conversion unit 32 shown in FIG. 5. In FIG. 6, an abscissa represents intensity of input light (the input light A) and an ordinate represents intensity of output light (the output light C).

As shown in FIG. 6, a relationship (a gradient) of the output light C relative to the input light A of the photothermal conversion unit 32 provided with a long opening 32b in the direction of the temperature gradient is gradual. In other words, heat generated by inputting the input light A to the photothermal conversion unit 32 causes, during a process of being transmitted through the protruding portion 32a, a temperature gradient in the temperature of the light intensity variation unit 20 in the opening 32b. Therefore, the light intensity variation unit 20 in the opening 32a has a gradient from high optical transmittance to low optical transmittance at a temperature near a cloud point of the light intensity variation unit 20. As a result, the intensity of the output light C varies gradually relative to the input light A.

Figure 7:
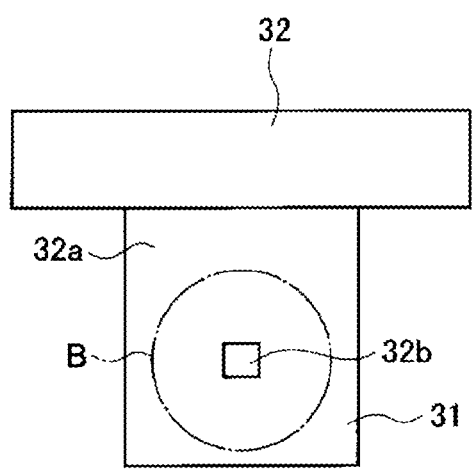
FIG. 7 is a diagram schematically showing a shape of another example of the photothermal conversion unit shown in FIG. 4 when viewed from front.

On the other hand, FIG. 7 is a diagram which schematically shows the photothermal conversion unit 32 provided with a short slit in the transmission direction of temperature of the protruding portion 32a. An orientation of the photothermal conversion unit 32 shown in FIG. 7 is the same as that in FIG. 5.

Figure 8:
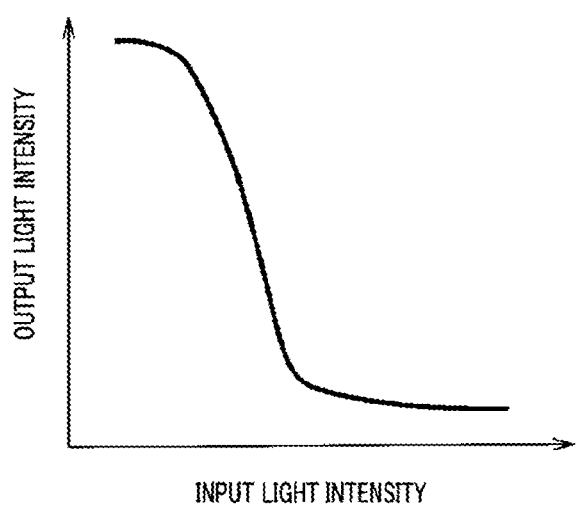
FIG. 8 is a diagram schematically showing a relationship between input light intensity and output light intensity of an optical operational element including the photothermal conversion unit shown in FIG. 7.

FIG. 8 is a graph schematically showing a relationship between a temperature and transmittance of the optical operational element 2 provided with the photothermal conversion unit 32 shown in FIG. 7. A relationship between an abscissa and an ordinate in FIG. 8 is the same as in FIG. 6.

As shown in FIG. 8, a relationship (a gradient) of the output light C relative to the input light A of the photothermal conversion unit 32 provided with a short opening 32b in the direction of the temperature gradient is steep. In other words, the temperature of the light intensity variation unit 20 in the opening 32a which is short in the direction of the temperature gradient varies to a prescribed uniform temperature within a short period of time. Therefore, the external light B is to be transmitted through a portion with a prescribed uniform optical transmittance of the opening 32b. As a result, a variation in intensity of the output light C relative to the input light A is steep.

As described above, the photothermal conversion unit 32 includes the protruding portion 32a in a direction perpendicular to the propagation direction of the external light B, the protruding portion 32a is provided with the opening 32b which is long in the transmission direction of temperature of the protruding portion 32a, and a beam of the external light B is irradiated into the opening 32b. Accordingly, a variation (a gradient) of the output light C relative to the input light A can be made gradual.

In addition, the photothermal conversion unit 32 includes the protruding portion 32a in a direction perpendicular to the propagation direction of the external light B, the protruding portion 32a is provided with the opening 32b which is short in the transmission direction of temperature of the protruding portion 32a, and a beam of the external light B is irradiated into the opening 32b. Accordingly, a variation (a gradient) of the output light C relative to the input light A can be made steep.

In addition, a direction of variation of the output light C relative to the input light A can also be inverted. In other words, a logic of the optical operational element can also be inverted.

The characteristics shown in FIGS. 6 and 8 are characteristics in a case where the light intensity variation unit 20 is constituted by an aqueous PNIPA solution that exhibits LCST behavior in which dispersed polymers become soluble and transmit light when cooled and agglomerated polymers become insoluble and scatter light when heated.

The light intensity variation unit 20 is constituted by an aqueous solution that exhibits UCST (Upper Critical Solution Temperature) behavior in which agglomerated polymers become insoluble and scatter light when cooled and nucleic acid polymers become soluble and transmit light when heated. Accordingly, an optical operational element can be realized which reduces the intensity of the output light C when the intensity of the input light A is low and increases the intensity of the output light C when the intensity of the input light A is high. In other words, the input light intensity-output light intensity characteristics shown in FIGS. 6 and 8 can be inverted (logic inversion).

Multilayer Neural Network)

A multilayer neural network can be constructed by cascade-connecting the optical operational element 1 according to the present embodiment in multiple layers. Alternatively, the optical operational element 2 can be cascade-connected in multiple layers.

Figure 9:
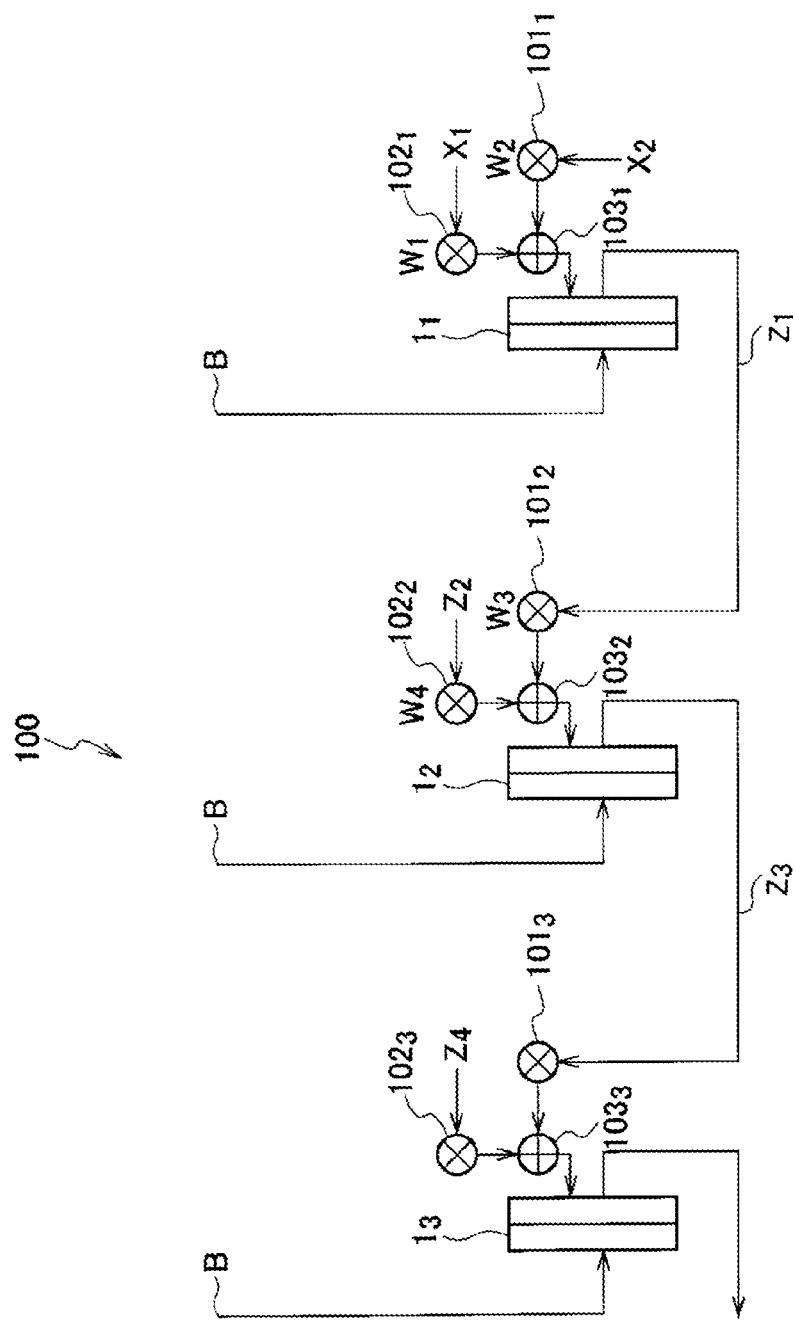
FIG. 9 is a diagram schematically showing an example of constructing a multilayer neural network by connecting the optical operational element according to an embodiment of the present invention in multiple layers.

FIG. 9 is a diagram schematically showing a configuration example of the multilayer neural network according to the present embodiment. A multilayer neural network 100 shown in FIG. 9 represents a cascade connection of the optical operational element 1 described above in two or more layers.

Output light $Z_1$ of an optical operational element $1_1$ of a first layer is input to a multiplier $101_2$ which generates input light of an optical operational element $1_2$ of a second layer. The multiplier $101_2$ multiplies the output light $Z_1$ by a weight $w_3$ and outputs the output light $Z_1$ to one of the inputs of an adder $103_2$.

The adder $103_2$ adds up an output of the multiplier $101_2$ and an output of a multiplier $102_2$ and generates input light of the optical operational element $1_2$. The output of the multiplier $102_2$ is obtained by multiplying output light $Z_2$ of an optical operational element (not shown) by a weight $w_4$.

The optical operational element $1_2$ of the second layer generates output light $Z_3$ by converting the external light B that is led in from the outside by a product-sum signal output by the adder $103_2$ which corresponds to the input light A. An optical operational element $1_3$ of a third or subsequent layer which generates output light $Z_5$ is configured to generate the output light $Z_5$ in the same manner as the optical operational element $1_2$ of the second layer. Numerals of the reference signs in the drawings are to be renewed and denoted and a description thereof will be omitted.

As described above, a multilayer neural network 100 according to the present embodiment is a multilayer neural network in which N (N≥2)-number of the optical operational elements 1 are cascade-connected, wherein input light $A_n$ of an optical operational element of an n (n=2, 3, . . . , N)-th layer includes output light $Z_{n-1}$ of an optical operational element of an n−1-th layer.

According to this configuration, external light B with a certain intensity is input to each optical operational element $1_n$ of each layer, and output light $Z_n$ is generated in which the external light B is converted by output light $Z_{n-1}$ of an optical operational element $1_{n-1}$ of a previous layer n−1. Therefore, the intensity of the output light $Z_n$ of a rearward optical operational element $1_n$ cascade-connected in multiple layers does not attenuate. As a result, there is no need for photoelectric conversion and the multilayer neural network can be no-electric power.

As described above, with the optical operational elements 1 and 2 according to the present embodiment, a multilayered optical neural network can be constructed without performing photoelectric conversion. In addition, with the multilayer neural network 100 according to the present embodiment, since the external light B is introduced from the outside to each layer, there is no longer a need to alternately perform operations using optical signals and electric signals. As a result, operations can be no-electric power.

It should be noted that the present invention is not limited to the example described above. Although the input light A, the external light B, and the output light C have each been described as being singular in the example described above, a plurality of beams of each light may be input to and output from one housing unit 10.

In addition, although the protruding portion 32a of the photothermal conversion unit 32 has been described as being singular in the example described above, the protruding portion 32a may be provided in plurality in a similar manner to an air-cooling fin. Furthermore, although the shape of the optical operational elements 1 and 2 has been described as being a near-cubic shape in the example described above, the shape is not limited thereto.

In addition, although the protruding portion 32a of the photothermal conversion unit 32 has been described as having a T-shaped cross section in the propagation direction of the external light B in the example described above, the shapes of the photothermal conversion unit 32 and the protruding portion 32a are not limited thereto. The photothermal conversion unit 32 and the protruding portion 32a may have any shape as long as the shape provides an opening that opens in the propagation direction of the external light B and causes a beam of the external light B to be irradiated into the opening.

As described above, the present invention is not limited to the embodiments described above and various modifications may be made within the spirit and scope of the invention. Although a specific example of a processing method of the optical operational elements 1 and 2 has not been described, all existing semiconductor processes and micromachining techniques can be used for the processing.

REFERENCE SIGNS LIST

1,2 Optical operational element
10 Housing unit
20 Light intensity variation unit
30, 32 Photothermal conversion unit
32a Protruding portion
32b Opening
100 Multilayer neural network
A Input light
B External light (beam shape)
C Output light

The invention claimed is:

1. An optical operational element, comprising:
a photothermal conversion unit which converts light energy of input light into thermal energy; a light intensity variation unit which is in contact with the photothermal conversion unit and which varies, in accordance with a temperature variation accompanying heat generation or heat absorption by the photothermal conversion unit, intensity of external light that is introduced from the outside; and
a housing unit which houses the light intensity variation unit and which introduces the external light from one side and outputs output light obtained by attenuating intensity of the external light to the outside on an opposite side to the one side.

2. The optical operational element according to claim 1, wherein the photothermal conversion unit includes a protruding portion in a direction perpendicular to a propagation direction of the external light, the protruding portion is provided with an opening which is long in a transmission direction of temperature of the protruding portion, and a beam of the external light is irradiated into the opening.

3. The optical operational element according to claim 1, wherein the photothermal conversion unit includes a protruding portion in a direction perpendicular to a propagation direction of the external light, the protruding portion is provided with an opening which is short in a transmission direction of temperature of the protruding portion, and a beam of the external light is irradiated into the opening.

4. A multilayer neural network in which N (N≥2)-number of the optical operational element according to claim 1 are cascade-connected, wherein the input light of an optical operational element of an n (n=2, 3, ..., N)-th layer includes output light of an optical operational element of an n−1-th layer.

5. A multilayer neural network in which N (N≥2)-number of the optical operational element according to claim 2 are cascade-connected, wherein the input light of an optical operational element of an n (n=2, 3, ..., N)-th layer includes output light of an optical operational element of an n−1-th layer.

6. A multilayer neural network in which N (N≥2)-number of the optical operational element according to claim 3 are cascade-connected, wherein the input light of an optical operational element of an n (n=2, 3, ..., N)-th layer includes output light of an optical operational element of an n−1-th layer.

* * * * *